United States Patent [19]

Rupert

[11] 3,829,059

[45] Aug. 13, 1974

[54] AUTOMATIC VALVE ADAPTER

[75] Inventor: William A. Rupert, San Gabriel, Calif.

[73] Assignee: Dial Industries, Inc., Los Angeles, Calif.

[22] Filed: June 8, 1973

[21] Appl. No.: 368,030

[52] U.S. Cl.................. 251/26, 251/130, 251/44, 137/315
[51] Int. Cl............................................. F16k 31/02
[58] Field of Search........ 137/315, 322, 454.5, 269; 251/26, 35, 44, 130

[56] References Cited
UNITED STATES PATENTS

| | | | |
|---|---|---|---|
| 2,694,544 | 11/1954 | Hall | 251/35 |
| 2,882,006 | 4/1959 | Reinecke | 251/26 |
| 3,065,885 | 11/1962 | Chatten | 137/322 X |
| 3,279,743 | 10/1966 | De La Garza | 251/35 X |
| 3,472,268 | 10/1969 | Sherwood | 137/454.5 X |
| 3,735,772 | 5/1973 | Hunter et al. | 251/44 X |

Primary Examiner—Henry T. Klinksiek
Attorney, Agent, or Firm—Miketta, Glenny, Poms & Smith

[57] ABSTRACT

An adapter attachable to a valve body having an inlet port and an outlet, and including a housing provided with an operating chamber; a piston in the chamber having a larger diameter than the inlet port and provided with a lower closure member sealable with said inlet port, and a spring biasing the piston toward sealing position; an inlet passage through the piston from the inlet port to the operating chamber; pilot valve means for bleeding liquid from the operating chamber to permit inlet water pressure to force the piston closure member upwardly away from the inlet port thus opening the main valve. The pilot valve is desirably solenoid operated, and manual override pilot valve means are provided, which may be incorporated in the solenoid. A washer shiftably mounted in the piston has an aperture constituting an orifice in the piston inlet passage. A control rod fixed to the housing projects through the orifice to restrict liquid flow therethrough, and has a portion of enlarged section which enters the orifice as the closure member approaches valve closed position, in order to gently close the valve and thus avoid water hammer in the system. A spring wire bail serves during assembly to retain the piston in the housing against the force of the spring. Throttle means limit the upward of opening movement of the piston and closure member.

10 Claims, 15 Drawing Figures

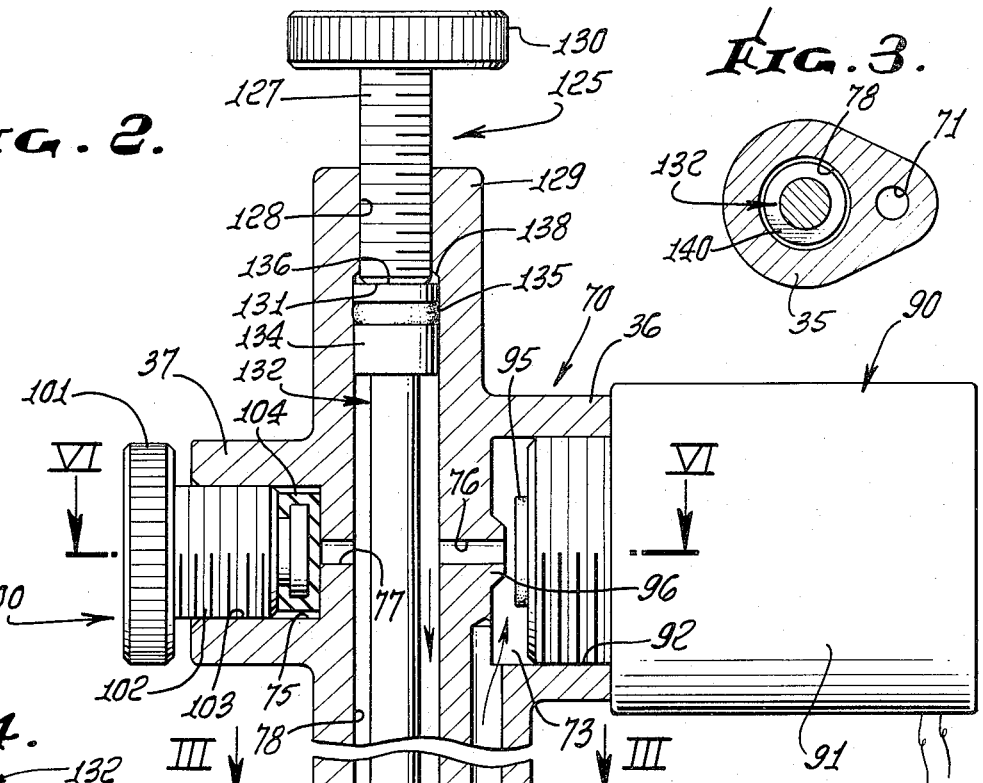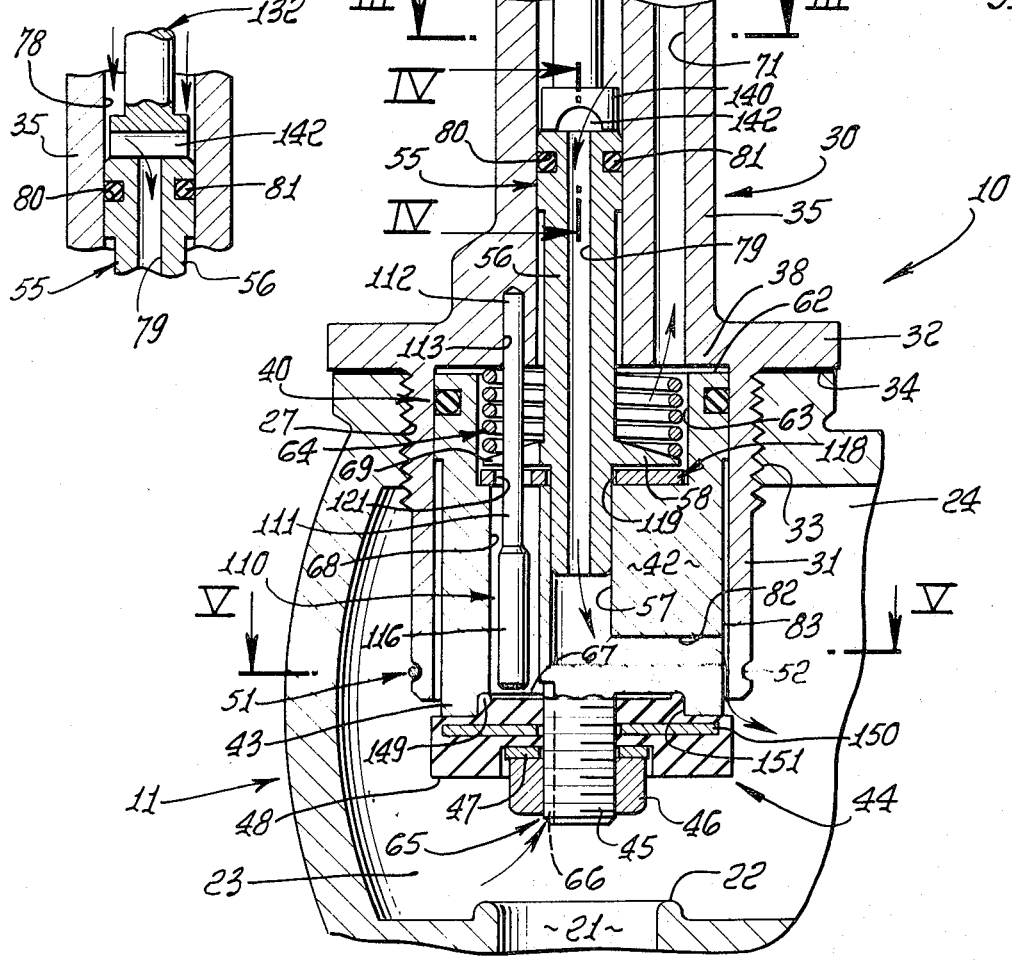

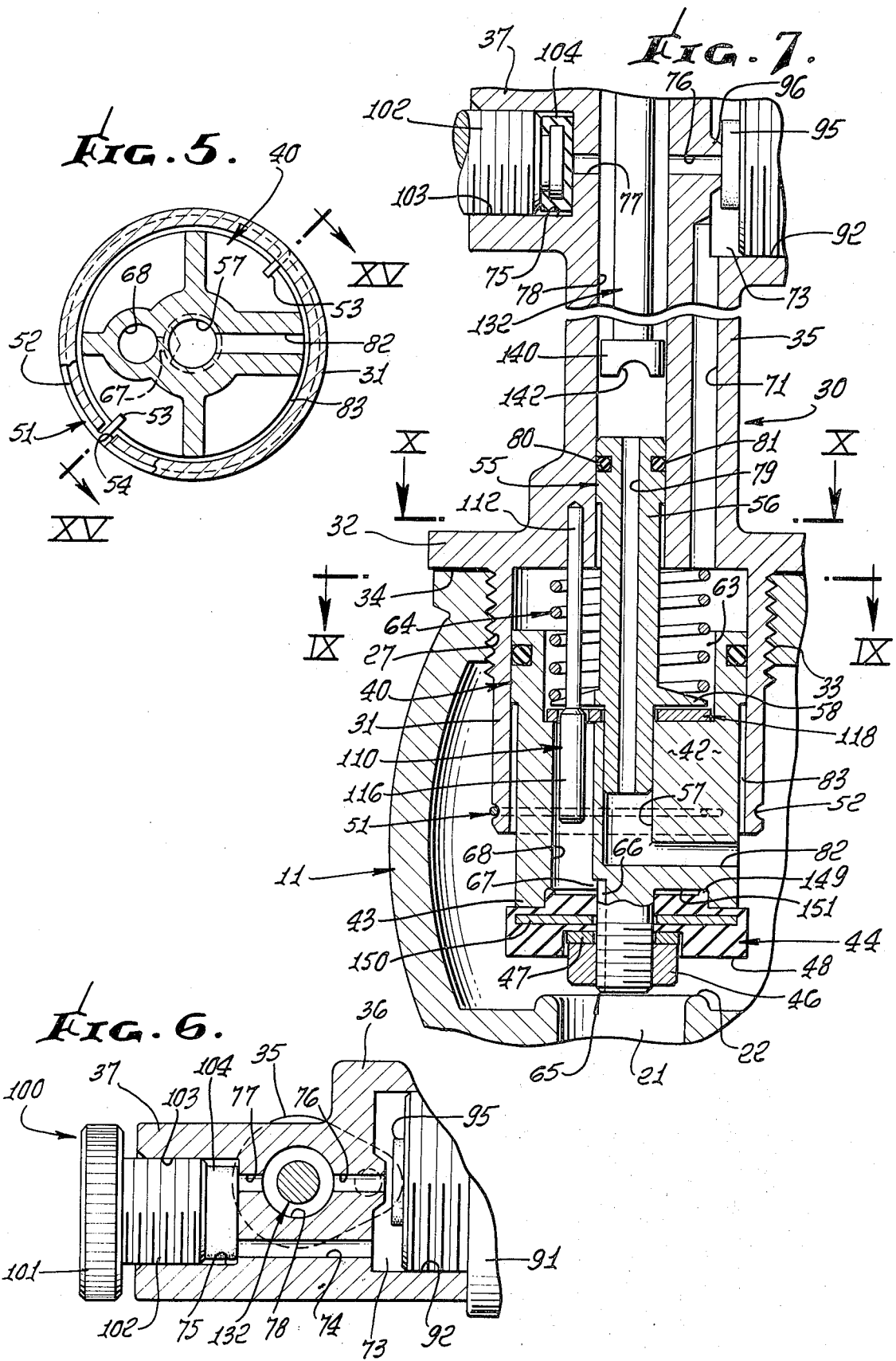

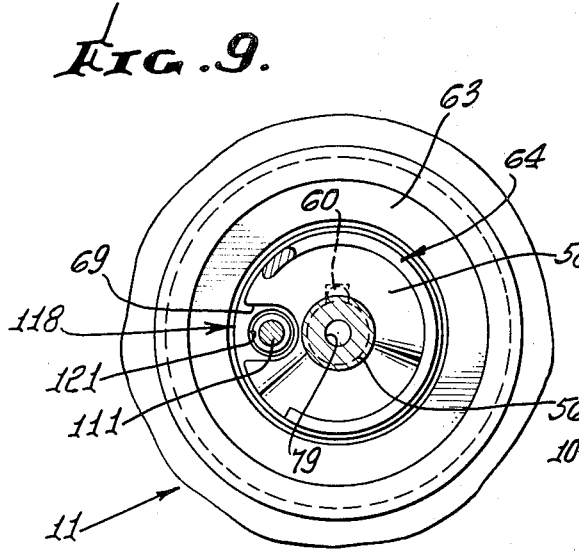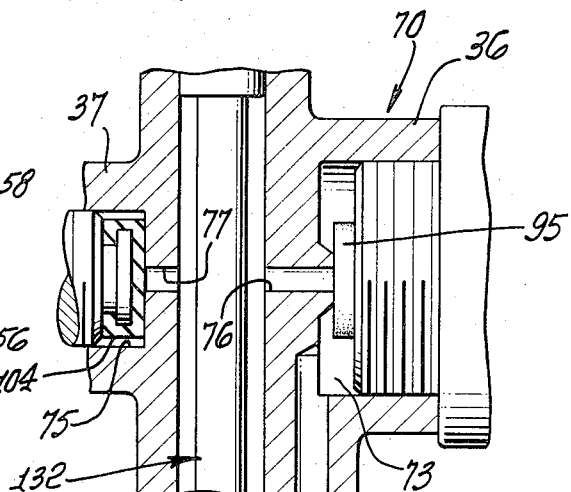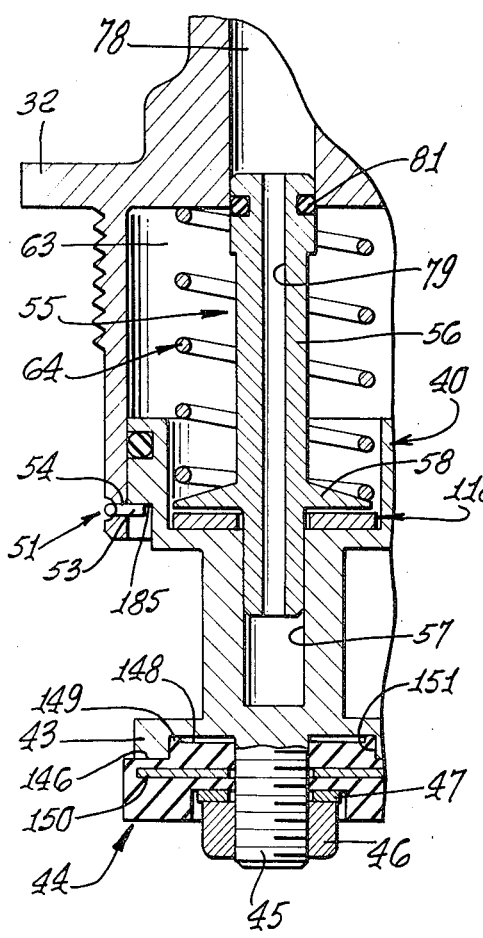

PATENTED AUG 13 1974 3,829,059

AUTOMATIC VALVE ADAPTER

BACKGROUND OF THE INVENTION

This invention relates to automatic fluid control valves, and more particularly to an automatic valve adapter for converting a manual water system to an automatic water system by utilizing upstream water pressure, to selectively move a piston.

Currently, the trend is toward installing sprinkler systems for watering lawns, shrubs, etc. which are fully automatic, that is, the sprinkler system has a control device which opens automatic sprinkler valves, usually at a given time of day to water the lawn, and then, a preselected time later, closes the automatic sprinkler valves to discontinue the watering of the lawn. Such automatic sprinkler systems may use either electrical or fluid controls or sometimes a combination of both, to operate the valves, and require additional piping to the valves to open and close the valves themselves. This additional piping makes existing automatic fluid control valves too expensive for quickly, easily and inexpensively converting a manual sprinkler system to an automatic system.

SUMMARY OF THE INVENTION

Therefore, it is a primary object of this invention to provide a novel automatic valve adapter for installation in the existing valve body in a manual sprinkler system to simply, easily and inexpensively convert the originally manual sprinkler system to an automatic sprinkler system.

Other and additional objects of this invention are to provide an automatic valve adapter which uses upstream water pressure to move a piston for closing the valve; to provide an adapter having a piston operating chamber between the upper piston surface and the housing therearound; to provide a passage through the piston for passing the upstream water to the piston operating chamber without requiring additional piping; to provide a vent to bleed the water in the piston operating chamber downstream of the adapter when the piston is to be raised to an open position; to provide means for selectively closing the vent to pressurize the upper surface of the piston from upstream water, trapped in the piston operating chamber to close the valve; to provide such a valve with the vent which may be selectively closed by a solenoid; to provide such a valve operated by a solenoid in response to timing control means to automatically initiate the opening and closing of the valve; to provide such a solenoid operated valve with an internally venting or an externally venting manual override valve; to provide such a valve with a piston which initially moves rapidly toward the inlet port seat, but which moves slowly as the piston approaches the seat; to provide such a valve having a speed control passage which is restricted adjacent the closed position of the piston to slow the movement thereof; to provide such a valve with a rod having an enlarged head extending into the speed control passage to restrict the passage; and to provide such a valve adapter which is inexpensive to manufacture, easy and simple to install and dependable in operation.

Generally, the automatic valve adapter, according to this invention for a water system includes a valve body with a chamber having an inlet port with a valve seat, an outlet, and a piston housing receiving opening; a housing mounted in the valve body and together therewith forming a piston receiving chamber; a downwardly biased piston disposed in the piston receiving chamber, having a lower surface on which is mounted a resilient seal, and having an upper surface; an operating chamber between the upper surface of the piston and the housing; an inlet passage opening the operating chamber to the inlet, vent passages bleeding the operating chamber to the outlet; and selectively operable means to selectively close the vent passages whereby the upstream water acting on the upper surface of the piston moves the piston downwardly until the piston engages the valve seat to block the flow of water therethrough, opening of the selectively operable means bleeding the water in the piston operating chamber enabling the water pressure acting on the lower surface to raise the piston and open the valve. The selectively operable closure means may include a solenoid, or a manual valve with an internal vent or an external vent. The piston may include a rod extending into the inlet passage to restrict the passage as the piston approaches the seat, to slow the approach of the piston. Means may also be provided to vary the location of the open position to selectively change the volume of the water flowing through the valve.

BRIEF DESCRIPTION OF THE DRAWINGS

FIG. 2 is a vertical sectional view of the adapter mounted in the valve body, with the adapter piston being shown in the raised or open position.

FIG. 3 is a sectional view taken along the plane III—III of FIG. 2.

FIG. 4 is a fragmentary sectional view taken along the plane IV—IV of FIG. 2.

FIG. 5 is a sectional view taken along the plane V—V of FIG. 2.

FIG. 6 is a fragmentary sectional view taken along the plane VI—VI of FIG. 2.

FIG. 7 is a fragmentary vertical cross-sectional view similar to FIG. 2, but showing the solenoid pilot valve in its closed position and the piston and closure member approaching the closed position.

FIG. 8 is a view similar to FIG. 7, but showing the piston and closure member in fully closed position.

FIG. 9 is a fragmentary sectional view taken along the plane IX—IX of FIG. 7.

FIG. 15 is a fragmentary sectional view taken on line XV—XV of FIG. 5, showing how the piston is temporarily retained in the housing prior to final assembly into the valve body.

DETAILED DESCRIPTION

Figure 1:
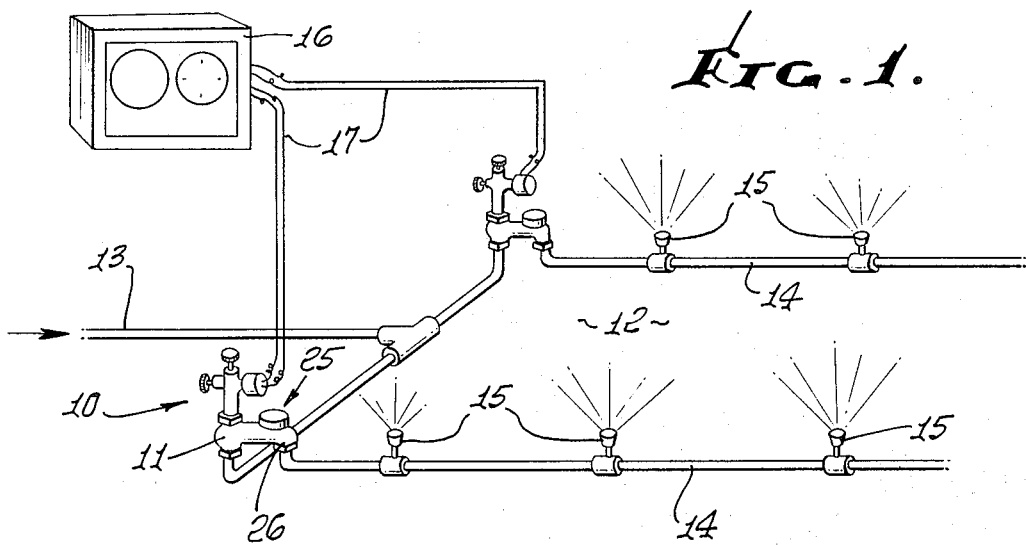
FIG. 1 is a schematic view of a sprinkler system with the adapter, according to this invention, being mounted in the existing valve bodies of the system, and with a control box operating the adapters to convert the originally manual sprinkler system into an automatic sprinkler system.
Figure 10:
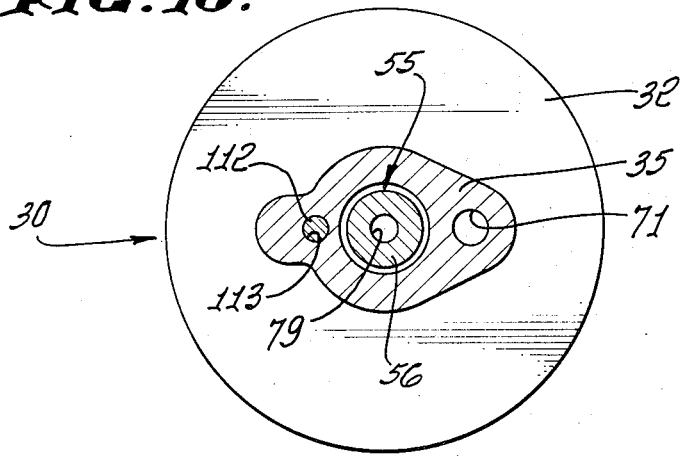
FIG. 10 is a sectional view taken along the plane X—X of FIG. 7.

Referring now in detail to the drawings, and particularly to FIG. 1, an automatic valve adapter according to this invention is generally indicated by the numeral 10, shown mounted in a conventional valve body 11 located in a water system such as a sprinkler system 12.

The automatic valve adapter 10 is ideally suited for converting a manual sprinkler system to automatic sprinkler system, and so will be primarily described in this environment. However, the inherent advantages of the adapter 10 make it equally well suited for use in an originally installed automatic sprinkler system.

As is shown schematically in FIG. 1, the sprinkler system 12 includes fluid supply line 13 connected to the valve body 11, and fluid outlet lines 14 running from the valve body 11. The fluid discharge lines 14 have a series of sprinkler heads 15 extending upwardly therefrom. The heads 15 are usually mounted flush with the ground to evenly distribute the water in a fine spray or mist therefrom for watering grass or other plants when the automatic valve adapter 10 is open. The automatic sprinkler system 12 is also provided with a control box 16 which will be mounted conveniently for the home owner, and which contains means therein for operating the automatic valve adapter 10 at certain preset times and for certain preset durations during the day. The illustrated control box 16 is electrical and so the signals from the control box 16 are carried by control wires 17 to the automatic valve adapter 10 located in the valve body 11. The control box 16 could also operate on a pneumatic, hydraulic, or other suitable control medium, and if so, the wires 17 would be replaced by a suitable carrier for that control medium.

Referring now to FIG. 2, the illustrative valve body 11 of the sprinkler 12 is of one-piece construction and has an inlet port 21 surrounded by a seat 22 for admitting water into a valve chamber 23. The valve chamber 23 opens horizontally to an outlet 24 leading to a conventional vacuum breaker 25 (see FIG. 1) usually required to prevent backflow in the sprinkler system 12. The lower end of the vacuum breaker 25 has an outlet 26 to one of the discharge lines 14.

Returning to FIG. 2, a threaded valve housing receiving opening 27 is located in the valve body 11, vertically above the seat 22 and aligned with the inlet 21.

The automatic valve adapter 10, according to the preferred embodiment of this invention, generally includes housing 30 for insertion into the valve body 11, a piston 40 in the housing 30 and having inlet passage 65 and vent means or pilot valve 70 cooperating to move the piston 40 between a raised or open position, and a lowered or closed position, in response to actuation of a selectively operable actuator means 90. The valve adapter 10 may also include manual override pilot valve means 100 for manually opening the valve if actuator 90 is inoperable; means 110 for restricting the inlet passage to vary the speed of approach of the piston 40 during closing of the valve; and throttle means 125 for selectively limiting the raiseed or open position of the piston 40 to control the volume of liquid flow through the valve body 11.

In the preferred embodiment of this invention, the housing 30 for installation into the valve body 11 generally includes a tubular lower end 31 having at its upper end an annular flange 32 and threads 33 cut therein below the flange 32 for engaging the threads of the threaded opening 27 of the valve body 11. An annular seal 34 is provided between the upper surface of the valve body 11 and the lower surface of the flange 32.

The housing 30 in the preferred embodiment also has a hollow column 35 extending upwardly centrally of annular flange 32. Column 35 has in its upper portion a solenoid boss 36, and opposite thereto a manual override valve boss 37 whose function will be explained later. The bosses 36 and 37 are vertically spaced above the annular flange 32 to permit rotation of the housing 30, as required to thread the housing 30 into the threaded opening 27 with the protruding bosses 36 and 37 passing over the vacuum breaker 25.

Housing 30 is provided with a cylindrical lower portion 31 for receiving piston 40, which is desirably composed of a lower part 42 and an upper part 55 (see FIG. 12) to accommodate shiftable washer 118, as will be explained later. The piston parts may be molded of any suitable material of which plastic has proved to be most desirable.

Piston 40 is provided with a lower annular shoulder 43 and a central threaded post or stud 45 for receiving and mounting a seal indicated generally at 44 constituting the valve closure member for sealing against inlet port seat 22. Seal 44 is retained in position by nut 46 threaded on stud 45 and washer 47. A preferred form of closure member will be described in detail in connection with FIG. 13 hereinafter.

Resilient means are provided for biasing piston 40 downwardly toward closed position, such means here including helical spring indicated generally at 64 received in an enlarged counterbore 63 in the upper portion of the piston, the counterbore forming part of an operating chamber bounded upwardly by wall 38 of the housing.

During assembly of housing 30 with valve body 11 it is desirable to provide retaining means for preventing spring 64 from expelling piston 40 from housing 30. In the present embodiment of the invention, such retaining means include a bail indicated generally at 51 (see FIG. 5) extending approximately 180° around the lower end 31 of housing 30 and received in a circumferential groove 52 formed in the outer wall of the housing. Bail 51 includes a pair of inturned legs 53 projecting through a pair of diametrically opposed openings 54 formed in the housing wall and communicating with groove 52. Bail 51 is made of suitable material having slight resiliency, such as heavy guage wire. In assembling the present adapter, spring 64 and piston 40 are inserted into the lower end 31 of the housing and, while the user holds the piston inwardly against the force of the spring, the legs 53 of the bail are sprung apart by flexing the arcuate portion of the bail, to permit the legs to be inserted into openings 54. The user then releases the piston, permitting it to be forced downwardly by spring 64 until, as best seen in FIG. 15, internal shoulder 185 of the piston abuts the upper surface of legs 53. Thus bail 51 serves only as a tool during assembly, and performs no function during valve operation, since the lowest possible position of piston 40, once it is assembled with the housing and valve body 11, is that shown in FIG. 8.

Figure 11:
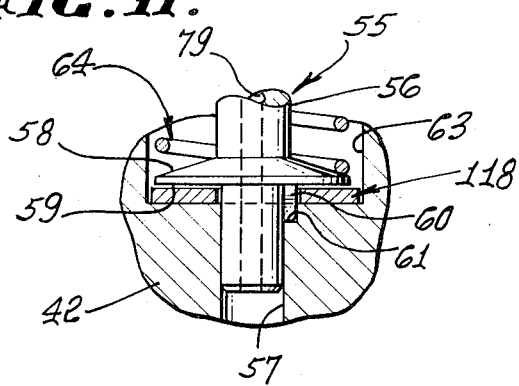
FIG. 11 is a fragmentary sectional view taken along the plane XI—XI of FIG. 8.
Figure 12:
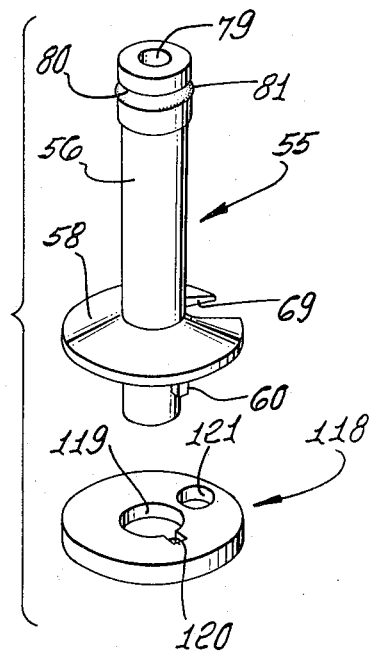
FIG. 12 is an exploded view of the piston upper part and the washer for shiftable mounting thereto before insertion into the piston lower part.

The upper part 55 of the piston 40 includes a cylindrical stem 56 located in a central hole 57 in the lower part 42 and bonded to the lower part therein. As best seen in FIG. 12, the stem 56 has a flanged skirt 58 thereon and is spaced from the lower part 42 (see FIG. 11) to form a cavity 59 for shiftably receiving an apertured washer 118. The outwardly extending skirt 58 is maintained spaced from the lower part 42 by engagement of a spline or rib 60 on stem 56 bottoming in a mating notch 61 extending radially from the surface of hole 57 to lock the two parts 42 and 55 concentrically together. The depth of rib 60 relative to that of notch 61 is such as to space the lower face of skirt 58 above the annular face of piston part 42 by a distance greater than the thickness of washer 118, so that the latter is permitted some limited movement in cavity 59.

An inlet passage indicated generally at 65 is provided for providing liquid flow to operating chamber 63 from the inlet port 21, so that upstream line pressure exists in operating chamber 63. In the preferred embodiment, the inlet passage 65 includes a vertical channel 66 cut in the threaded post 45 and extending above the seal 44. The channel 66 communicates through horizontal passageway 67 with a vertically oriented and axially offset hole 68 in the lower part 42. An aligned axially offset slot 69 is provided in the skirt 58 of the upper part 55.

Vent or bleed means 70 is provided for bleeding water from the operating chamber 63 to the outlet 24, and includes a first outlet passage 71 and a second outlet passage 76. The first outlet passage 71 constitutes a vertical bore in the column 35 of the housing 30 leading to a solenoid cavity 73 located in the right boss 36. A cross-over passage 74 (see FIG. 6) extends from the solenoid cavity 73 to a manual valve cavity 75 in the left boss 37.

Passages 76 and 77 communicate the respective cavities 73 and 75 with a central vertical bore 78 in housing 30, in turn communicating with a central bore 79 in the stem 56 which in turn opens to the central hole 57 of the lower part 52. The upper end of stem 56 extends into the vertical central bore 78 and is vertically slidable therein. Near the upper end of stem 56 is a circumferential groove 80 having an O-ring seal 81 therein to seal between the stem 56 and bore 78. The lower part 42 has a horizontally extending passage 82 from the central hole 57 to an annular clearance space 83 between the lower piston and the chamber wall.

The cross-sectional areas of the first outlet passage 71 and of the second outlet passage 76 are desirably at least as large as the minimum cross-sectional area of the inlet passage 65, including channel 67 and washer aperture 121 as limited by control rod 110, to be described later, so that the vent means 70 is capable of bleeding water from the piston operating chamber 63 more rapidly than the water can enter the piston operating chamber 63 from inlet 21.

A selectively operable closure means indicated generally at 90 is provided for selectively closing the vent means 70 to cause the upstream water pressure to act upon the upper surface 62 of the piston 40 and thereby move the piston to the closed position. In the present illustrative embodiment of the invention, the selectively operable closure means 90 includes a solenoid 91 mounted in a threaded opening 92 in the right boss 36. The armature or plunger of the solenoid 91 is biased leftwardly by an internal spring (not shown), and carries on its left end a closure member or seal 95 which is sealingly engageable with a seat 96 surrounding the right end of horizontal passage 76. When the solenoid is not energized, seal 95 engages the seat 96 to close the second outlet passage 76 from fluid communication with the first outlet passage 71 and thus to close or block the vent means 70. In response to a suitable energizing signal from the control box 16, the solenoid 91 moves the plunger and seal 95 rightwardly against the action of the internal spring, thus opening the second outlet passage 76. The upstream pressure in the piston operating chamber 63 is thereby relieved, while the upstream pressure of the water in the vertical inlet 21 of the valve body 11 acts on the lower surface 48 to raise the movable piston 40 against the biasing of spring 64, thus opening inlet port 21. Additional water that flows through the inlet passage 65 into the piston operating chamber 63 is bled through the vent means 70 to prevent the buildup of pressure in the chamber. Thus the upstream water pressure moves the piston 40 to the open position of FIG. 2.

To close the valve, solenoid 91 is de-energized by stopping the signal from the control box 16 via the control wires 17 to the solenoid 91 enabling the internal spring to move the plunger seal 95 into sealing relation with seat 96 to close or block the passage of water from the first outlet passage 71 to the second outlet passage 76 and thereby close the vent means 70, as seen in FIG. 8. With no bleeding of water from chamber 63, the pressure of the water therein will rapidly become substantially equal to the upstream water pressure at inlet port 21 acting on the lower surface 48 of the piston closure member 44. With upward and downward fluid forces on the piston assembly being approximately equal, the biasing force of spring 64 moves the piston 40 from the raised open position of FIG. 2 downwardly until the lower surface 48 of the resilient seal 44 engages the seat 22 to close the inlet port 21, as seen in FIG. 8. The area of inlet port seat 22 is desirably appreciably smaller than the effective area of piston 40 exposed to liquid pressure in the operating chamber 63. This fact, plus the force of spring 64, insures that the valve remains tightly closed until the pressure in chamber 63 is reduced by bleeding liquid therefrom.

In the event that the solenoid 91 becomes inoperable, or in the event that manual operation is desired for any reason, a manually override means 100 is provided. The manually override means 100 includes a knob 101 having a shank 102 threaded by engaging an opening 103 in the left boss 37 of the housing 30. Shank 102 has on its right end a seal 104 which when closed, as seen in FIG. 6, seals the left end of the horizontal passage 77 and the left end of the passage 74, thereby blocking the flow of water between the passage 74 from the solenoid cavity 73 and the second outlet passage 76. Normally the manually overridge means 100 remains in its closed position, as is shown in FIGS. 2, 7 and 8, and the solenoid 91 in parallel therewith selectively opens and closes the vent means 70. However, the solenoid controlled pilot valve may be bypassed by manually turning the knob 101 to retract the seal 104 leftwardly, thereby opening the left ends of passages 74 and 77 and thus establishing a path to bleed liquid from operating chamber 63, via bore 71, cavity 73, bore 74, cavity 75, bores 77, 78, 79 and 82 to outlet 24. It should be noted that the manual override means 100 releases the water in the operating chamber 63 to pass downstream of the adapter and not to the outside of the valve body as do many prior art release means, and thereby eliminate the spraying of the operator, as such prior art valves frequently do.

Referring to FIG. 2, and particularly to the lower portion thereof, means are provided in accordance with the invention for restricting the flow of water through the vertical bore 68 formed in the lower portion 42 of the piston assembly, such restricting means desirably also including means for further restricting such flow when the piston is in its lower most portion of its downward travel, just before the closure member 44 carried on the lower end of the piston seals with inlet port seat 22. Such restricting means are here shown as including a vertically oriented control rod 110 having an upper elongate portion 111 whose uppermost end portion 112 is fixedly seated in a vertical hole 113 formed in housing 30. The lower portion of control rod 110 includes a cylindrical portion 116 of enlarged diameter.

Means are provided in the passageway for water from inlet port 21 to operating chamber 63 for providing an orifice through which such water passes and which, in cooperation with control rod 110, permits that rod to perform its restricting function. As has been previously described in connection with FIG. 11, an annular washer indicated generally at 118 is shiftably housed in the cavity 59 existing between the lower face of skirt 58 and the annular face of piston part 42. As shown in FIG. 12, washer 118 includes a central bore 119 and a radially extending notch 120 whose dimensions are slightly larger, both to radial length and as to width, than the corresponding dimensions of spline or rib 60, formed integrally with stem 56. Washer 118 is also provided with an aperture 121 extending therethrough, and skirt 58 of upper piston part 55 is provided with a radial slot 69 formed therein, disposed in general angular alignment with aperture 121, but somewhat greater in arcuate extent than that of aperture 121. This fact permits a certain amount of angular shiftability of washer 118 within cavity 59 while the aperture remains in vertical alignment with slot 69. As will be noted by reference FIG. 11, the inside diameter of washer bore 119 is slightly larger than the outside diameter of stem 57, and the outside diameter of washer 118 is slightly smaller than the inside diameter of operating chamber counterbore 63 of piston part 42. It will thus be seen that washer 118 is permitted limited shifting movement, both radially and angularly, within cavity 59.

With continued reference to FIG. 12, upper piston part 55 is provided with a central bore 79 extending therethrough, and in its upper portion has an O-ring 81 mounted thereon for sealing engagement with housing bore 78.

Shiftability of washer 118 is a highly desirable characteristic of the present invention, particularly in view of manufacturing tolerances which might affect the precise location of control rod 110 relative to housing 30. As will be evident, the control rod is of substantial length projecting downwardly from the mounting of its upper end 112 in vertical hole 113, so that only a very minor angular misalignment in the mounting of the control rod 110 relative to the housing 30 would cause a substantial deviation of the lower portion of the control rod from its designed location, which in turn could well cause binding of the control rod relative to the movable piston 40, if it were not for the shiftability of washer 118.

The present illustrative embodiment of the present invention contemplates the provision of throttle means indicated generally at 125 in the upper portion of FIG. 2, including a thumb screw having a threaded shank 127 received in an internally threaded bore 128 of an upper neck portion 129 of housing 30. Thumb screw 125 includes an upper enlarged portion 130, which may be knurled or otherwised roughened for convenience of grasping by the thumb and forefinger of the user, for rotation within the threaded bore 128, in order to adjust the vertical position of the thumb screw. Immediately beneath the thumb screw 125 is a plunger indicated generally at 132, which is slidably received within internal bore 78 of the housing 30, and which throughout most of its length has an outside diameter substantially smaller than the inside diameter of that bore, to permit water flow in the annular space between the plunger and the bore. At the upper end of the plunger 132 there is provided a portion of enlarged diameter 134 provided with an O-ring 135 in sealing relationship with the bore 78, to prevent flow of water above the O-ring. The upper circular face 136 of the plunger is abuttable against the lower face 131 of thumb screw 125, and internal bore 78 is narrowed at 138, immediately beneath the threaded portion of the bore 128, so that even if thumb screw 125 were completely removed, plunger 132 cannot rise higher than that permitted by abutting contact of the upper surface 136 of the plunger against the restricted shoulder 138.

At the lower end of plunger 132 there is provided a portion 140 of somewhat greater diameter than that of the major portion of the length of the plunger, but of an outside diameter somewhat smaller than the inside diameter of the bore 78 within which enlarged head is vertically movable. A transverse passage 142 is provided in the lowermost face of head 140, and this transverse pasageway, together with the annular clearance between the enlarged head and the bore 78, insures continuity of fluid communication between the annular space between plunger 132 and bore 78 and the internal bore 79 of upper piston part 55. The lower enlarged head 140 of plunger 132 is in immediate abutting contact with the upper annular face of piston part 55.

It will accordingly be seen that the positioning of the throttling thumb screw 125 vertically relative to the housing 30 will determine the upper limit of travel of plunger 132 and hence of piston part 55 abuttable upwardly against the plunger. In FIG. 2, the throttling means is shown at almost its uppermost position, permitting almost the widest opening of the lower closure member or seal 44 relative to inlet port seat 22, and consequently almost the maximum flow of water through the valve. As will also be readily seen, adjustment of throttling thumb screw 125 downwardly from its position seen in the upper portion of FIG. 2 will limit the upward movement of plunger 132, and hence of the piston assembly 40, and thereby permit substantially less than a maximum opening of the valve when actuaged to open position. Throttling thumb screw 125 may indeed serve to maintain the principal valve in closed position under all conditions, thus completely disabling the valve in its normal operational function, if so desired, by threading thumb screw 125 completely downwardly into the housing 30. Under these conditions, regardless of the opening of the solenoid pilot valve 70 or the manual override pilot valve 100, the main valve will remain closed.

Movement of the valve from its open position of FIG. 2 to its fully closed position of FIG. 8 will now be described by reference to those figures as well as FIG. 7, which shows an intermediate position during the closing movement. Thus, in FIG. 2 the seal 95 actuated by the plunger of solenoid 90 is shown in its withdrawn or retracted position, corresponding to energization of the solenoid. Under these conditions, water in operating chamber 63 is permitted to bleed upwardly through bore 71 to solenoid chamber or cavity 73, thence laterally through bore 76 into vertical bore 78, thence downwardly around plunger 132 and past the enlarged head 140 of the plunger, into bore 79 of the upper piston part 55, into hole 57 and lateral passageway 82 of the lower piston part 42, and thence to valve outlet 24.

When, now, solenoid 71 is de-energized, its internal spring will move its plunger leftwardly as seen in FIG. 2, so that seal 95 carried by the plunger will close the opening of seat 96 at the right end of passage 76, thus interrupting the bleeding flow of water described immediately above. As a consequence, pressure commences to rise in operating chamber 63 by reason of its fluid communication with upstream water pressure at inlet port 21. This increasing pressure in operating chamber 63, assisted by the downward force of helical spring 64, will at some point overcome the upward force on closure member or seal 44 carried by the piston resulting from inlet water pressure, and will cause piston assembly 40 to move downwardly.

Initially, such downward movement will be fairly rapid because water flow into operating chamber 63 from inlet port 21 through aperture 121 will be restricted only by restrictor portion 111, of relatively small diameter. However, as the parts approach their position shown in FIG. 7, the restrictor portion 116 of enlarged diameter enters the aperture 121 of shiftable washer 118, and consequently decreases the rate of flow of water upwardly through said aperture into operating chamber 63. Piston assembly 40 thus continues its downward movement, but at a substantially lower rate of speed, until it reaches the fully closed position of FIG. 8, with seal or closure member 44 seated upon inlet port seat 22 and held tightly thereagainst by inlet water pressure existing in operating chamber 63, supplemented by the downward force of helical spring 64.

Bleeding of water from the operating chamber 63 will permit the main valve to be opened by reason of the inlet water pressure exerted upwardly on closure member 44 at inlet port 21. Such bleeding of operating chamber 63 can be accomplished, as described hereinabove, by energization of solenoid 91 and consequent retraction of sealing member 95 from seat 96. Alternatively, bleeding of water from operating chamber 63 can be accomplished by the use of the manual override means 100, and more specifically by rotation of thumb wheel 101 whereby to unscrew threaded shank portion 102 from its engagement with boss 37, and thus withdrawing the sealing or closure member 104 leftwardly as seen in FIG. 2, whereby its sealing face 105 no longer closes the left ends of channels 74 and 77 (see FIG. 6), thereby establishing fluid communication between those two transverse channels. The bleed path thus established permits the pressure in operating chamber 63 to diminish, thereby permitting inlet water pressure to open the valve.

Figure 13:
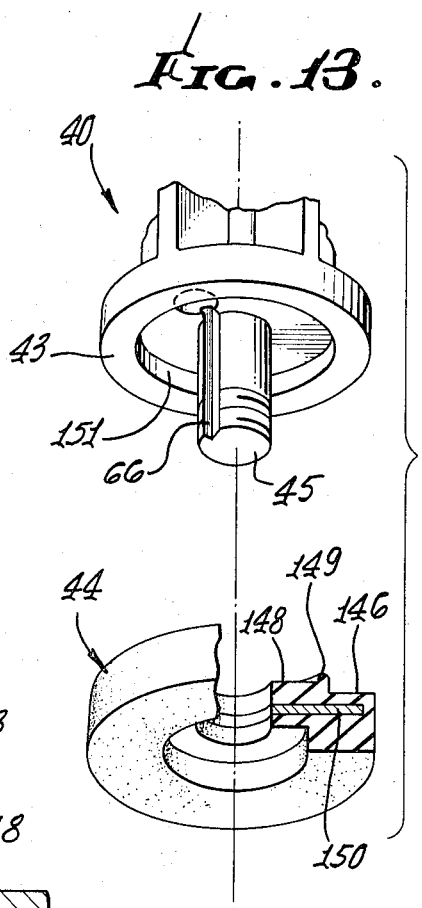
FIG. 13 is an exploded view of a preferred form of closure member mounted on the lower end of the piston.

A preferred form of closure member or seal 44 to be mounted on the lower end of piston 40 is shown in FIG. 13. Thus seal 44 includes an outer upwardly directed annular surface 146 and an inner portion of reduced diameter 148 bounded outwardly by a circumferential shoulder 149. Seal 44 is made principally of rubber or rubber substitute, and desirably has embedded therein a strengthening washer 150 made of metal. When seal 44 is mounted in operative relation with the lower face of piston 40, as seen in FIGS. 2, 7, 8 and 14, the annular face 146 is placed in abutting contact with annular shoulder 43 of the piston, and the portion 148 of reduced diameter is received in the counterbore 151 of the lower piston face. Thus the upstanding annular or circumferential shoulder 149 is forced into tight sealing relationship with the inner piston face, immediately inwardly of counterbore 151, and such tight contact is enhanced by the stiffening effect of washer 150. The same stiffening effect insures that the central annular portion 148 of the seal is not squeezed upwardly to interfere with the radial flow of water between the upper end of notch 66 formed in stud 45 and the lower end of bore 68 formed in the piston.

Figure 14:
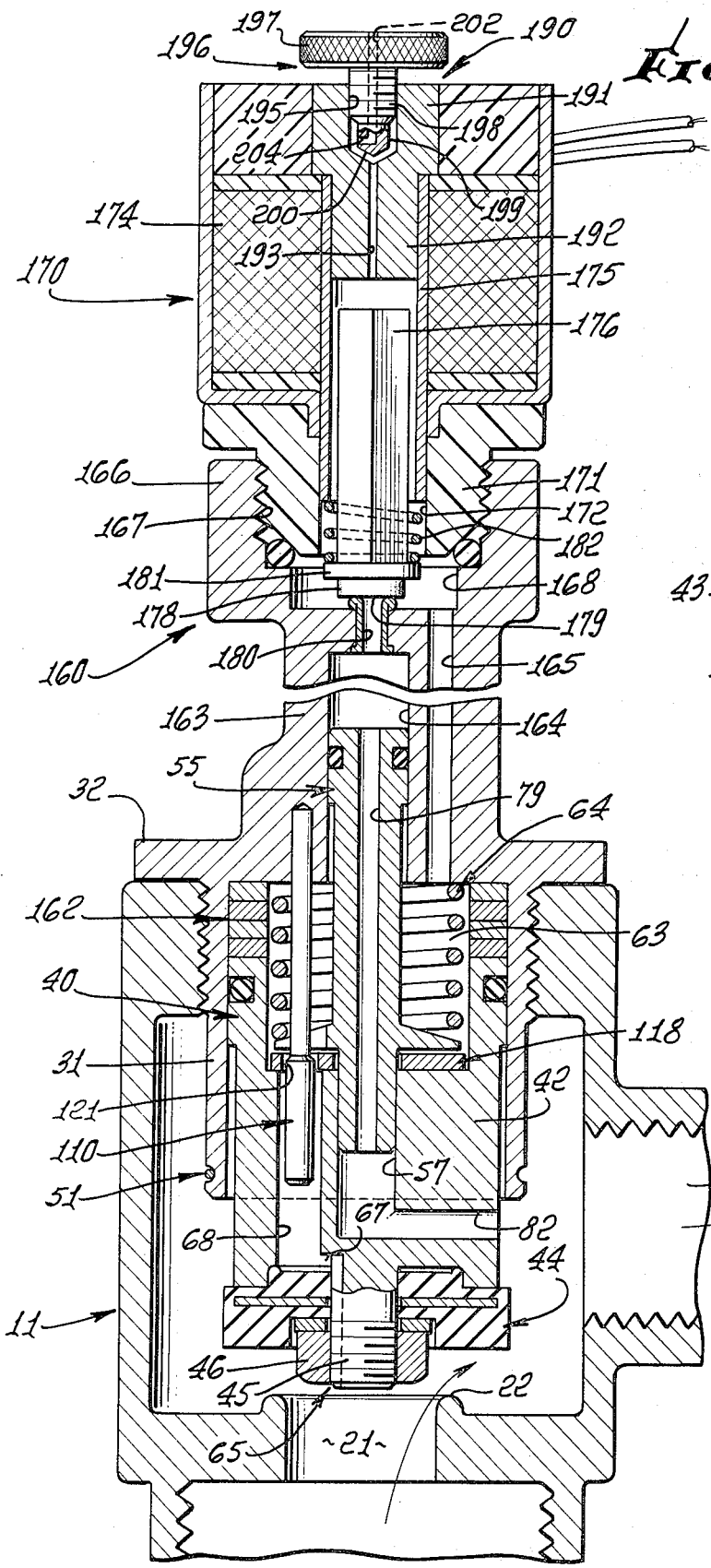
FIG. 14 is a vertical sectional view of an alternative embodiment of the present invention, with the valve shown in open position.

An alternative form of the present invention is shown in FIG. 14, the manual override pilot valve being shown in open or bleed position, and the main valve consequently being shown in its open position. The valve adapter of FIG. 14 includes a housing indicated generally at 160 including an annular flange 32 and a lower tubular end portion 31, identical to the correspondingly numbered portions of the valve construction heretofore described. All component parts of the structure seen in FIG. 14 below annular flange 32 are identical in every respect to those heretofore described in connection with FIGS. 2, 7 and 8 with the exception of a group of throttling shims indicated generally at 162, located within the operating chamber immediately above the piston 40.

Above annular flange 32, the housing 160 includes a vertically extending column 163 in which is formed a central bore 164 and, laterally offset therefrom, a vertical passageway 165 extending upwardly from operating chamber 63. Housing 160 includes an enlarged upper portion 166 having formed therein a threaded bore 167 and a lower concentric counterbore 168 forming a small chamber communicating with the upper end of vertical passageway 165. A solenoid assembly indicated generally at 170 includes a lower tubular portion 171 threaded into the threaded bore 167 and provided with a central bore 172 communicating at its lower end with the chamber formed by counterbore 168.

The solenoid proper includes a coil 174 wound on a core or bobbin 175 which is fixed at its lower end within bore 172, and an armature or plunger 176 is vertically movable within the bobbin core 175. At its lower end, plunger 176 has fixed thereto a seal or closure member 178 which serves, when the plunger is in lower or closed position as seen in FIG. 14, to seat upon and close port 179 at the upper end of a vertical passageway 180, communicating at its lower end with the upper end of central bore 164 formed in the housing. Immediately above closure member 178 and fixed to armature 176 is an enlarged shoulder 181, and resilient means are provided for biasing plunger 176 downwardly, here shown as including a helical spring 182 bearing at is lower end on the enlarged portion 181, and at its upper end on the lower end of bobbin core 175. Thus, plunger 176 and closure member 178 fixed thereto are biased downwardly as seen in FIG. 14 into the closed position shown, and assume that position when the solenoid winding 174 is not energized. Solenoid plunger 176 is of small cross-sectional area than that of core 175, and may be rectangular in section, so that fluid communication exists along the sides of the plunger within the core.

In its upper portion, solenoid assembly 170 includes a central sleeve member indicated generally at 190, having an enlarged upper portion 191 and a lower portion 192 of reduced diameter, received in bobbin core 175. A vertically disposed central bore 193 extends from the lower end of sleeve 190 up to the bottom of a threaded bore 195 in which is threadedly received a manual petcock indicated generally at 196, including a knurled thumbwheel 197 and a downwardly extending shank 198. The lower end 199 of shank 198 is of reduced diameter to provide an annular clearance therearound within bore 195. The lowermost end of shank 198 is tapered in contour at 200, to sealingly seat in a correspondingly tapered portion of sleeve 190, the apex of such tapered portion communicating with the central bore 193 in the sleeve. Petcock 196 is provided with a vertical central bore 202 which includes at its lower end a lateral extension 204 communicating the central bore 202 with the annular clearance space 199 within the bore 195.

With continued reference to FIG. 14, it will be understood that when solenoid assembly 170 is energized by current flow in the coil 174, the movable armature 176 will be drawn upwardly from its position seen in FIG. 14, against the force of helical spring 182, to retract closure member 178 upwardly, and thereby open the port 179 at the upper end of passageway 180. Under these conditions, water pressure existing in operating chamber 63 will cause water flow upwardly through bore 165 into the chamber formed by counterbore 168, and thence downwardly through bores 180, 164 and 79 into the central hole 57 formed in piston 40, and thence through lateral bore 82 to outlet 24.

When it is desired to bleed pressure fluid from operating chamber 63 manually, rather than by actuation of the solenoid as just described, the petcock 196 is unscrewed, whereby to break the seal between the tapered surfaces 200 at the lower end of bore 195. This will permit water under pressure to flow upwardly from bore 168, around the sides of armature 176, within the bobbin core 175, thence upwardly through bore 193 of pole 190, lateral passageway 204 and vertical bore 202, to be bled to the outside. With the pressure of water in operating chamber 63 thus relieved, the valve 40 will move upwardly to its open position as seen in FIG. 14.

Means are provided, as mentioned earlier, for throttling the maximum open position of valve 40 in the construction of FIG. 14, and in the present illustrative embodiment of the invention include a set of one or more annular shims 162 received in the upper portion of operating chamber 63, outwardly of helical spring 64 within that chamber. As will be seen, shims 162 are abutted from below by the upper annular surface of piston 40, whereby to establish an upper limit of travel for the piston. In originally setting up a sprinkler system in accordance with the present invention, using the embodiment of the invention shown in FIG. 14, a selected number of shims in the group 162 may be used, in order to obtain the desired rate of flow through the valve when open.

Accordingly, there is here provided a valve adapter for ready attachment to the valve body of an existing manual valve in a sprinkler system or similar installation, whereby to convert the former manual system to automatic operation. The device of the present invention provides ease of initial installation by reason of the manual bleeding means provided in the several forms of the invention, and the variable speed of closing resulting from the cooperation of control rod 110 in aperture 121 eliminates water hammer in the system which might otherwise result from excessively rapid closing of the valve.

Modifications and changes from the illustrative forms of the invention hereinabove shown and described not departing from the spirit of the invention are intended to be embraced within the scope of the appended claims.

I claim:

1. An automatic valve adapter for converting a manual water system to an automatic water system, said manual water system including a valve body with a chamber, a lower inlet port for supplying water under pressure into the chamber and a peripheral valve seat therearound, an open outlet from the chamber and a housing receiving opening in the valve body, said adapter comprising:

a housing in said housing receiving opening, said housing having a piston receiving cylinder:

a movable piston in said cylinder, said piston having a lower surface located over said valve seat, and having an opposite surface which together with the housing defines an operating chamber;

a seal on said lower surface, said piston being movable within said cylinder between a closed position wherein said seal engages the valve seat to block the flow of water through the inlet port, and an open position wherein said seal is spaced from the valve seat;

an inlet passage communicating said operating chamber with said inlert port, including means for increasingly restricting liquid flow through the inlet passage as the piston approaches its closed position, to thereby slow the movement of the piston;

a vent passage bleeding said operating chamber to said outlet to allow water to flow from said operating chamber to said outlet; and selectively operable closure means selectively closing said vent passage to prevent the bleeding of water from the operating chamber whereby the water flowing into the operating chamber from the inlet passage is trapped therein and acts on the upper surface of the piston to move the piston and seal to the closed position.

2. The adapter as defined in claim 1 wherein the selectively operable closure means includes a seat surrounding said vent passage, a solenoid mounted in the housing, and a plunger located in the solenoid and aligned with the seat for selectively engaging the seat to close the vent passage.

3. The adapter as defined in claim 2 additionally comprising a manual override means for venting the operating chamber and thereby permitting the piston to be moved to the open position.

4. The adapter as defined in claim 3 wherein the manual override means is in parallel with the selectively operable closure means.

5. In a valve having a valve body provided with a lower chamber, a lower inlet port communicating the chamber with a source of pressurized liquid and an outlet, housing means forming a cylinder communicating downwardly with said lower chamber, a piston movably mounted within the cylinder and defining an operating chamber in the cylinder above the piston, the piston having mounted thereon a lower seal axially aligned with the inlet port for selectively opening and closing said inlet port in accordance with longitudinal piston movement, and an inlet passage formed through the piston and seal for communicating pressure liquid from the inlet port to the operating chamber, and means for selectively trapping liquid in or bleeding liquid from the operating chamber to said outlet, the provision of means for restricting the effective cross-sectional area of the inlet passage comprising:
- a control port formed in the piston and constituting a portion of the inlet passage;
- means forming a cavity in said control port;
- a member having a control hole therein housed in the cavity and permitted limited shiftable movement therein;
- and a control rod fixed to the housing means and projecting downwardly generally parallel to the axis of piston movement through said hole for restricting liquid flow therethrough.

6. The invention as defined in claim 5 wherein the effective cross-sectional area of the portion of the control rod in the control hole is greater when the piston and seal are approaching their lower positions for closing the inlet port than when the piston and seal are in their upper positions corresponding to inlet port open condition.

7. A solenoid for assembly with a housing having a fluid filled chamber and an outlet port for bleeding the chamber, comprising:
- a case assemblable with the housing and having a central bore in fluid communication with the chamber;
- an elongated plunger longitudinally movable in the bore;
- a closure member carried at one end of the plunger and resilient means biasing the plunger longitudinally of the bore toward a position in which the closure member closes the port;
- an operating coil in the case and coaxially surrounding the bore, energization of the coil serving to move the plunger against the force of the resilient means and thereby to open the port;
- and manual override means carried by the case for selectively bleeding fluid from said bore.

8. The invention as defined in claim 7 wherein opposite ends of the bore are in fluid communication with one another.

9. The invention as defined in claim 8 wherein the plunger has a cross-sectional area less than that of the bore.

10. The invention as defined in claim 8 wherein said manually operable means is disposed at the end of said case opposite to said outlet port.

* * * * *

UNITED STATES PATENT OFFICE
CERTIFICATE OF CORRECTION

Patent No. 3,829,059      Dated August 13, 1974

Inventor(s) William A. Rupert

It is certified that error appears in the above-identified patent and that said Letters Patent are hereby corrected as shown below:

On the cover sheet cancel "[73] Assignee: Dial Industries Inc., Los Angeles, Calif. --.

Signed and sealed this 5th day of November 1974.

(SEAL)
Attest:

McCOY M. GIBSON JR.      C. MARSHALL DANN
Attesting Officer      Commissioner of Patents